April 4, 1961     J. A. KELLER     2,978,308

BONDING AGENT FOR COMPOSITE TYPE PROPELLANT

Filed Nov. 14, 1957

INVENTOR.
J. A. KELLER

BY Hudson E. Young

ATTORNEYS

United States Patent Office

2,978,308
Patented Apr. 4, 1961.

2,978,308

BONDING AGENT FOR COMPOSITE TYPE PROPELLANT

John A. Keller, Bartlesville, Okla., assignor to Phillips Petroleum Company, a corporation of Delaware Filed Nov. 14, 1957, Ser. No. 696,565

7 Claims. (Cl. 52—.5)

This invention relates to a bonding agent for composite type propellants. In one aspect it relates to a solid propellant charge built up from a plurality of small blocks or grains of propellant material of the composite type, said blocks being bonded together with a novel bonding agent or adhesive which is self-combustible and has a burning rate comparable to that of the propellant material.

Rocket motors utilizing solid propellant may be classified in several categories depending on their size, shape and/or configuration of the charge, and on their utility (i.e., jet-assisted-take-off, booster, sustainer, or missile). Each classification has specific problems relating to its requirements and specifications. The present invention generally relates to those rocket motors utilizing large sustainer propellant charges having relatively long burning durations and capable of imparting high total impulses.

Rocket motors of the sustained-thrust type call for large sustainer propellant charges which involve scale-up problems of fabrication and assembly not found in the prior art. Since large sustainer propellant charges may weigh as much as 6,000 pounds or more, hazards in fabricating and handling such large masses of propellant material are encountered. It is generally not feasible to extrude or cast a single large grain of propellant material having such great weight.

It has recently been found that these large propellant charges can be made by building up a plurality of small blocks or grains of propellant to form a large propellant charge which for all intents and purposes acts as a single grain. Fabricating the large propellant charge in this manner permits a more thorough and rigid inspection of the propellant charge for cracks, fissures, or other imperfections. Moreover, building up large propellant charges in this manner enables the propellant fabricator to vary the burning rate and other performance characteristics of the charge by employing blocks of propellant having variable burning rates, shapes, and sizes.

Building up a large propellant charge from a plurality of small blocks of propellant requires the use of some type of bonding agent or adhesive for bonding together contiguous surfaces of the blocks of the propellant. This bonding agent must be combustible and have a sufficiently high burning rate so that the burning or consumption of the propellant mass will proceed from one block of propellant to the next without slowing down or stopping when the progressively generated burning surface encounters the bonding agent. The usual rubber base cements are not applicable since their burning rates are so slow that they are practically non-combustible and may even cause cessation of combustion (a phenomenon known as "snuffing"). Moreover, the bonding agent must have a desirable degree of resiliency and be capable of withstanding forces of inertia, vibration, mechanical shock, and temperature-induced stresses and strains which tend to separate the blocks of propellant causing an undesirable exposure of burning surface area.

Accordingly, an object of this invention is to provide a novel bonding agent for composite type propellant. Another object is to provide a solid propellant charge built up from a plurality of blocks of propellant material, said blocks being bonded together with a novel bonding agent. A further object is to provide a solid propellant charge built up from a plurality of blocks or grains of propellant material bonded together in such a manner that the consumption of the propellant material will proceed unimpeded from one block of propellant to the next despite the bonding material disposed therebetween. Another object is to bond a plurality of blocks of propellant together to form a single large propellant charge, the bond being capable of withstanding forces of inertia, vibration, mechanical shock, and temperature-induced stresses and strains which tend to cause separation of the blocks with the resultant increase in burning surface area. Further objects and advantages of this invention will become apparent to those skilled in the art from the following discussion, appended claims, and accompanying drawing in which:

Figure 1:
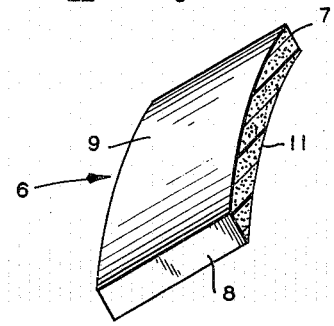
Figure 1 is an isometric view of a typical block or grain of propellant.
Figure 3:
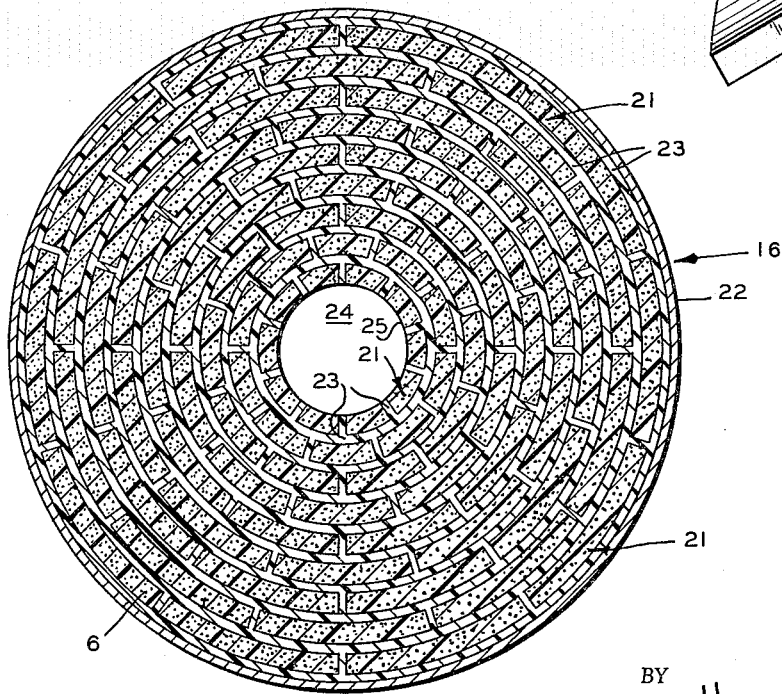
Figure 3 is a transverse sectional view in elevation of the rocket motor of Figure 2 taken along the plane 3—3.

Referring to the drawing now, and initially to Figure 1, a single grain or block of solid rocket propellant is shown generally designated 6. Block 6 is generally concavo-convex in cross-section, having radial ends 7, 8, outer curved surface 9 and inner curved surface 11, the length of the inside arc of the latter surface being slightly shorter than the length of the outside arc of the former surface. Block 6 can vary in size and shape and can be fabricated by extrusion or any other suitable method.

Figure 2:
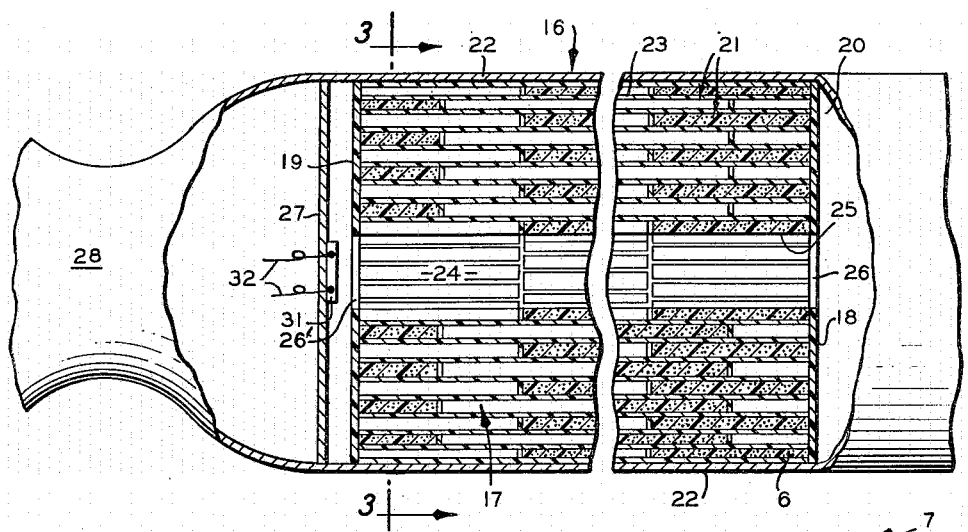
Figure 2 is a longitudinal sectional view in elevation of a rocket motor of the sustainer-type loaded with a large, composite propellant charge, the individual blocks of which are bonded together according to the instant invention.

In Figure 2, a rocket motor of the sustainer-type, generally designated 16, has a cylindrical casing or housing 22 defining a combustion chamber 20 in which is loaded a large, cylindrical propellant charge generally designated 17. The ends of charge 17 are covered with annular plates of restricting material 18, 19, which can be made from rubber or the like. Charge 17 comprises a plurality of concentric propellant strata 21, each of which comprise in turn a plurality of individual blocks or grains 6, such as that shown in Figure 1. The blocks 6 in each stratum are bonded together at their contiguous surfaces with the novel bonding agent 23 of this invention. Contiguous strata are also bonded together with this bonding agent 23 and the outermost stratum is preferably case-bonded with any suitable adhesive to the inner wall of the casing 22. Alternatively, the outer cylindrical surface of the outermost stratum can be bonded to suitable restricting material, such as rubber, with any suitable adhesive, and the restricting material bonded in turn to the casing 22 with a suitable adhesive. The innermost stratum of propellant has an exposed inner surface 25 which defines an axial perforation 24. Alternatively, the outer cylindrical surface of the outermost stratum can be exposed and annularly spaced from the inner wall of casing 22. Only nine cylindrical strata of propellant are shown in the drawing; however, it is to be understood that any number of strata can be employed, with varying dimensions.

Restricting plates 18, 19 are provided with axial openings 26, 26', respectively, which are substantially the same size as perforation 24. A suitable grid or spider 27 is positioned in the rocket motor casing 22 adjacent the nozzle portion 28 of the rocket motor 16. Nozzle portion 28 is constructed so as to define a converging-diverging passage for the exhaust of combustion gases at high velocity, and a separate nozzle portion may be substituted for the integral construction shown. A suitable blow-out disc is generally disposed in the nozzle exhaust section, in a manner well known in the art. Suitable ignition means such as an electrically actuated igniter 31 is secured to grid 27 in proximity to the end of the axial perforation 24. Electric wires 32 are in intimate contact with the igniter composition of igniting means 31 and extend from the rocket motor 16 through the nozzle passage to suitable contacts of a power source exterior to rocket motor 16.

In loading the rocket motor combustion chamber of Figure 2, the initial cylindrical stratum of blocks of propellant is preferably bonded to the casing of the rocket motor. Each succeeding cylindrical stratum is bonded to the previously loaded stratum in a similar manner using the bonding agent of this invention, and the blocks in each stratum are preferably staggered with respect to the blocks in the adjacent strata and with respect to adjacent blocks in the same stratum.

The bonding agent can be applied in the form of thinly rolled sheets (e.g., 0.01 to 0.1 inch thickness), or can be applied as a viscous liquid. After the charge is assembled, the whole is cured at elevated temperatures (e.g., 170–200° F.) while pressure is applied to the blocks of propellant to insure good contact of the bonding agent with the contiguous blocks of propellant.

Although I have described and illustrated a rocket motor loaded with a single charge, it is within the scope of this invention to provide a rocket motor loaded with a plurality of such charges, aligned for example in a tandem manner within the combustion chamber of the rocket motor. In addition, I do not intend to limit the propellant charge configuration or the individual blocks or grains of propellant to that described or illustrated herein and those skilled in the art will recognize that different shapes and sizes of blocks of propellant such as wedges, triangles, etc., can be bonded together with the novel bonding agent of this invention to form charges having other configurations, e.g., module grains with star-shaped perforations to obtain a relatively constant burning surface area and uniform thrust.

The propellant charge illustrated in the drawing has an internal burning surface which can be adapted to progressively increase in area. Where a relatively constant burning surface area is desired, the charge can also have an external exposed cylindrical burning surface in addition to an internal burning surface defined by an axial perforation—this type of charge being annularly spaced in the rocket motor combustion chamber and supported by suitable spiders or the like.

In operation, the igniter is energized by the closing of a suitable switch, causing the ignition and resulting combustion of the igniter pyrotechnic material. The resulting igniter combustion products resulting from the firing of the igniter 31 fill the combustion chamber 20, preferably propagating down the length of the axial perforation 24, thereby contacting the exposed inner surface 25 of the innermost cylindrical stratum so as to ignite this surface. Subsequently, the propellant charge 17 begins to burn and generate gaseous combustion products which raise the temperature and pressure within the combustion chamber 17. When a predetermined pressure is reached in the combustion chamber 17, the blow-out disc functions, for example by rupturing, and the generated gaseous products then flow through the nozzle passage, thereby imparting thrust to the rocket motor 16. The burning of the charge 17 takes place in relatively parallel layers, as is well known to those skilled in the art. As the progressively generated burning surface or advancing flame front encounters the layers of bonding material 23, between concentric strata 21 of propellant and between the contiguous blocks of propellant in each stratum, the bonding material itself burns at a relatively high rate which is comparable to that of the average burning rate of the charge 17, or for a more refined charge, at a rate comparable to that of the contiguous strata of propellant.

Since the bonding agent of this invention is combustible and has a desirably high burning rate, the charge can be consumed without intermittent interruptions or cessation in the burning process as the advancing burning surface or flame front encounters the bonding agent. As a result, the combustion chamber pressure will be maintained throughout the burning process. Moreover, since the bonding agent has a desirable degree of resiliency, the forces of inertia, vibration, mechanical shock, pressure, and temperature-induced stresses and strains will have lesser effect than otherwise on the mass of propellant.

The bonding agent of this invention comprises a coprecipitate of a vulcanizable rubbery substance, such as a copolymer of 1,3-butadiene and 2-methyl-5-vinylpyridine, and a minor amount of an inorganic oxidizing salt, such as ammonium perchlorate. This bonding agent is prepared by a method which comprises the steps of mixing a first solution of an inorganic oxidizing salt, such as ammonium perchlorate, dissolved in an organic polar solvent, such as acetone, with a second solution of a vulcanizable rubbery substance containing unsaturated carbon to carbon bonds, such as natural or synthetic rubber (e.g., butadiene/methylvinylpyridine), dissolved in an organic, relatively nonpolar solvent, such as benzene, which is miscible with the aforementioned first solvent. This mixing step results in coprecipitation of the inorganic oxidizing salt and the vulcanizable rubbery substance. The resulting coprecipitate is recovered from the solvent mixture by filtration, decantation, or the like. It can be rolled into thin sheets or can be worked into a viscous liquid by using suitable plasticizers. The strength of the bonding agent can be improved by adding to the coprecipitate conventional vulcanizing agents such as those used in preparing composite propellants comprising an oxidizer and a rubbery binder. The burning rate of the coprecipitated bonding agent is preferably the same as the propellant material and can be controlled by varying the particle size and amount of the oxidizer employed, and/or by adding suitable burning rate catalysts to the bonding material.

The oxidizing materials employed in preparing the coprecipitated bonding material are inorganic oxidizing salts including ammonium, alkali metal, and alkaline earth metal salts or nitric, perchloric, or chloric acids, and mixtures thereof. Suitable oxidizing materials representatively include sodium, potassium, magnesium and ammonium perchlorates, lithium and strontium chlorates, and potassium, sodium, calcium and ammonium nitrates. Ammonium perchlorate is especially suitable as the oxidizing material used in the preparation of the coprecipitated bonding material.

The vulcanizable rubbery materials containing unsaturated carbon to carbon bonds employed in the preparation of the coprecipitated bonding material include natural and synthetic rubbers, as, for example, butadiene-styrene, Perbunan, butyl, GR-I, GR-S, neoprene, polybutadiene, acrylonitrile-styrene, liquid polysulfide rubbers, and the like. Especially useful and preferred rubbery materials can be prepared by copolymerizing a conjugated diene, such as 1,3-butadiene, with a vinyl heterocyclic nitrogen compound, such as 2-methyl-5-vinylpyridine, to yield a rubbery material, such as those copolymers described in the copending application, Serial No. 284,447, filed April 25, 1952, by William B. Reynolds et al., and those described in the copending application Serial No. 561,943, filed January 27, 1956, by William B. Reynolds et al. The conjugated dienes described in the aforementioned copending applications, and useful in preparing the rubbery materials utilized in this invention, are those containing 4 to 6 carbon atoms per molecule and representatively include 1,3-butadiene, isoprene, piperylene, methylpentadiene, 2-methyl-1,3-butadiene, 2,3-dimethyl-1,3-butadiene, chloroprene, and the like. Various alkoxy derivatives, such as methoxy and ethoxy, and cyano derivatives of these conjugated dienes are also applicable and representatively include phenylbutadiene, 2,3-dimethyl-1,3-hexadiene, 2-methoxy-3-ethylbutadiene, 2-ethoxy-3-ethyl-1,3-hexadiene, 2-cyano-1,3-butadiene.

The vinyl heterocyclic nitrogen base compounds, described in the aforementioned applications, and useful as co-monomers in the preparation of the rubbery materials used in the bonding agent of this invention, are those which are copolymerizable with a conjugated diene and contain a

group where R is a hydrogen atom or a methyl radical. One or two vinyl groups may be present, and also alkyl groups may be present attached to the heterocyclic ring as long as there are not more than 12 carbon atoms in the total of these alkyl groups. These heterocyclic nitrogen compounds include the vinyl substituted pyridines, vinyl substituted quinolines, and vinyl substituted isoquinolines. Representative vinyl heterocyclic nitrogen compounds include 2-vinylpyridine, 5-vinylpyridine, 2-methyl-5-vinylpyridine, 5-ethyl-2-vinylpyridine, 2,6-diethyl-4-vinylpyridine, 2-isopropyl-4-nonyl-5-vinylpyridine, 3-vinyl-5-ethoxypyridine, 2-vinylquinoline, 2-vinyl-4-ethylquinoline, 3-vinylisoquinoline, 1,6-dimethyl-3-vinylisoquinoline, 3-methyl-2,5-divinylpyridine, 2-isopropenylpyridine, 2-vinylquinoline, 1-vinylisoquinoline, 2,5-divinylquinoline, 6,7-dimethyl-2,5-divinylquinoline, and the like.

In the preparation of the aforementioned copolymers of conjugated dienes with vinyl heterocyclic nitrogen compounds, the amount of conjugated diene employed is preferably in the range between 75 and 94 parts by weight per 100 parts monomers and the vinyl heterocyclic nitrogen compound is in the range between 25 and 5 parts. Terpolymers are applicable as well as copolymers and in the preparation up to 50 weight percent of the conjugated diene can be replaced with another polymerizable compound such as, styrene, acrylonitrile and the like.

The preferred readily available copolymer employed as the rubbery material in the preparing the bonding agent of this invention is a copolymer prepared from 90 parts by weight of 1,3-butadiene and 10 parts by weight of 2-methyl-5-vinylpyridine, this copolymer hereinafter abbreviated Bd/MVP. This copolymer is polymerized to a Mooney (ML–4) plasticity value in the range of 10–40, preferably in the range of 15–25, and may be masterbatched with 5–20 parts of Philblack A, a carbon black, per 100 parts of rubber.

The organic polar solvents used to dissolve the inorganic oxidizing salt in the preparation of the coprecipitated bonding material can be any solvent which will dissolve the salt and be miscible with the organic, relatively non-polar solvent used to dissolve the rubbery material. Representative organic polar solvents include acetone, methyl alcohol, isopropyl alcohol, and the like.

Sufficient organic polar solvent can be employed to prepare a solution having a salt concentration of about 30 to 100 percent of the saturated solution; a substantially saturated salt solution is preferred. The amount of oxidizer which coprecipitates with the rubbery material will be a minor amount of the final product and can be varied as long as the bonding agent retains the rubbery characteristics of the rubbery material which is coprecipitated.

The organic, relatively non-polar solvent employed to dissolve the rubbery material used in preparing the coprecipitated bonding material can be any organic solvent which will satisfactorily dissolve the rubbery material and which is miscible with the aforementioned organic polar solvent. Representative organic, non-polar solvents include benzene, toluene, cyclohexane, cumene, methylcyclohexane, suitable refining streams such as a $C_6$ to $C_9$ fraction of platformate, and the like. Sufficient organic non-polar solvent is employed to give a solution with a rubber concentration of about 2 to 10 grams per 100 groms solvent, preferably 8 to 10 grams per 100 grams solvent.

The burning rate of the coprecipitated bonding agent can be controlled by varying the particle size of the oxidizer (e.g., 1–300 microns) and amount thereof. Alternatively, the burning rate can be controlled by incorporating into the bonding agent minor amounts of suitable burning rate catalysts (e.g., 0.025-1.5 weight percent), such as copper chromite, ammonium dichromate, potassium dichromate, sodium dichromate, ferrocyanides (sold under various trade names such as Milori blue, Prussian blue, etc.), and the like. Generally, the burning rates of the bonding agents can vary in the range between about 0.05 to 0.2 inch per second at 1000 p.s.i. The burning rate can be varied from stratum to stratum, to obtain progressive, retrogressive or constant thrust, by varying the catalyst content as disclosed in copending U.S. application, Serial No. 560,351, filed January 20, 1956, by B. R. Adelman.

Various plasticizers can be used in minor amounts to work up the coprecipitated bonding agent into a viscous liquid. Suitable plasticizers include dibutyl phthalate, dibutoxyethoxyethyl formal, benzophenone, monoamylbiphenyl, and the like. The bonding agent can be reinforced with minor amounts of various reinforcing agents, such as carbon black and the like. Suitable anti-oxidants, can be used in minor amounts, such as Flexamine (a physical mixture containing 65 percent of a complex diarylamine-ketone reaction product and 35 percent of N,N'-diphenyl-p-phenylenediamine), and the like. Curing agents can also be incorporated into the bonding agent in minor amounts, including Philcure 113 (N,N-dimethyl-S-tertiary butylsulfenyl dithiocarbamate), Butyl-8 (a dithiocarbamate-type rubber accelerator), GMF (quinone dioxime), DPG (diphenyl guanidine), sulfur zinc oxide, and the like.

Materials used in preparing the bonding agents of this invention, other than the rubbery material and oxidizer, can be termed supplementary compounding materials.

The propellant material utilized in fabricating the blocks of propellant used in fabricating the propellant charge can be prepared from a variety of known propellant materials.

We prefer to employ solid propellant mixtures of the composite-type comprising a major proportion of a solid oxidant, such as ammonium nitrate and preferably ammonium perchlorate, and a minor proportion of a rubbery binder material, such as a copolymer of a conjugated diene and a vinylpyridine or other substituted heterocyclic nitrogen base compound. Solid propellant mixtures of this nature and a process for their production are disclosed and claimed in the copending application Serial No. 284,447, filed April 25, 1952, by W. B. Reynolds and J. E. Pritchard.

Particularly useful propellant compositions which may be utilized in the practice of this invention are of the rubbery copolymer-oxidant type which are plasticized and worked to prepare an extrudable mass at 130° to 175° F. The copolymer can be reinforced with suitable reinforcing agents such as carbon black, silica, and the like. Suitable oxidation inhibitors, wetting agents, modifiers, vulcanizing agents, and accelerators can be added to aid processing and to provide for the curing of the extruded sheet propellant at temperatures preferably in the range of 170° to 185° F.

The following empirical formulation or recipe generally represents the class of propellant compositions preferred for the preparation of the propellant charge of this invention:

TABLE I

| Ingredient | Parts per 100 Parts of Rubber | Parts by Weight |
|---|---|---|
| Binder | | 10-25 |
| Copolymer (Bd/MVP) | 100 | |
| Philblack A (a carbon black) | 10-30 | |
| Plasticizer | 10-30 | |
| Silica | 0-20 | |
| Metal oxide | 0-5 | |
| Antioxidant | 0-5 | |
| Wetting agent | 0-2 | |
| Accelerator | 0-2 | |
| Sulfur | 0-2 | |
| Oxidizer (ammonium perchlorate) | | 75-90 |
| Burning rate catalyst (Milori blue) | | 0-10 |

Suitable plasticizers useful in preparing these propellant charges include TP-90B (dibutoxyethoxyethyl formal supplied by Thiokol Corp.); benzophenone; and Pentaryl A (monoamylbiphenyl). Suitable silica preparations include a 10-20 micron size range supplied by Davison Chemical Co., and Hi-Sil 202, a rubber grade material supplied by Columbia-Southern Chemical Corp. A suitable anti-oxidant is Flexamine, a physical mixture containing 65 percent of a complex diarylamine-ketone reaction product and 35 percent of N,N'-diphenyl-p-phenylenediamine, supplied by Naugatuck Chemical Corp. A suitable wetting agent is Aerosol-OT (dioctyl sodium sulfosuccinate, supplied by American Cyanamid Co.). Satisfactory rubber cure accelerators include Philcure 113 N,N-dimethyl-S-tertiary butylsulfenyl dithiocarbamate); Butyl-8 (a dithiocarbamate-type rubber accelerator supplied by R. T. Vanderbilt Co.); and GMF (quinone dioxime, supplied by Naugatuck Chem. Co.). Suitable metal oxides include zinc oxide, magnesium oxide, iron oxide, chromium oxide, or combination of these metal oxides.

The following empirical formulation or recipe generally represents the coprecipitated binder compositions useful in preparing the solid propellants of this invention.

TABLE II

| Ingredient | Weight Percent |
|---|---|
| Inorganic oxidizing salt (e.g., ammonium perchlorate) | 2-25, preferably 5-15. |
| Rubber [1] (e.g., Bd/MVP) | 98-75, preferably 95-85. |

[1] Including compounding materials.

Example I

A coprecipitated bonding agent was prepared in the following manner and the combustible nature thereof determined.

A solution of 19.8 g. of $NH_4ClO_4$ in 1800 ml. of acetone at 25° C. was prepared. Another solution of 35 g. of a 90/10 copolymer of 1,3-butadiene and 2-methyl-5-vinylpyridine in 90 ml. of benzene at 25° C. was prepared. This copolymer was prepared by emulsion polymerization. The two solutions were mixed together by pouring them in a vessel and stirring the resulting mixture; the acetone solution was added about twice as fast as the benzene solution. A coprecipitated solid comprising $NH_4ClO_4$ and Bd/MVP formed immediately. The solution mixture was decanted and the recovered coprecipitate was placed on a tray in an oven at 60° C. to remove the occluded solvents. The yield was about 38-40 g. of coprecipitate containing about 9 percent $NH_4ClO_4$ intimately dispersed in the copolymer.

A portion of the coprecipitated product was held over the mouth of a test tube and ignited with a lighted match. The coprecipitate ignited immediately and was dropped into the test tube when it burned steadily and evolved combustible gases which burned steadily when ignited as they issued from the mouth of the test tube. A carbonaceous residue remained in the test tube and burned when reignited.

Various modifications and alterations of my invention will become apparent to those skilled in the art without departing from the scope and spirit of our invention, and it is to be understood that the foregoing discussion and drawing merely illustrates the preferred embodiments of my invention and do not unduly limit the same.

I claim:

1. A composite solid propellant charge comprising a plurality of blocks of propellant of the composite type comprising a major amount of an inorganic oxidizing salt and a minor amount of a rubber binder, said blocks bonded together at their contiguous surfaces with a bonding agent consisting essentially of a coprecipitate of about 2-25 weight percent of an inorganic oxidizing salt and about 98-75 weight percent of a rubber.

2. A composite solid propellant charge comprising a plurality of blocks of propellant of the composite type comprising a major amount of an inorganic oxidizing salt and a minor amount of a rubber binder, said blocks being bonded together at their contiguous surfaces with a bonding agent consisting essentially of a coprecipitate of about 2-25 weight percent of an inorganic oxidizing salt selected from the group consisting of ammonium, alkali metal, and alkaline earth metal salts of an acid selected from the group consisting of nitric, perchloric, and chloric acids, and about 98-75 weight percent of a rubber.

3. The propellant charge of claim 2 wherein said propellant comprises a major amount of ammonium nitrate and a minor amount of a rubbery copolymer of 1,3-butadiene and 2-methyl-5-vinylpyridine, and said coprecipitate consists essentially of about 2-25 weight percent of ammonium perchlorate and about 98-75 weight percent of a rubbery copolymer of 1,3-butadiene and 2-methyl-5-vinylpyridine.

4. A solid propellant charge having a cylindrical configuration with an axial perforation, said charge comprising a plurality of blocks of propellant of the composite type comprising about 75-90 parts by weight of an inorganic oxidizing salt and about 10-25 parts by weight of a rubber binder, said blocks being bonded together at their contiguous surfaces with a bonding agent and arranged so as to provide an exposed burning surface which defines said perforation, said bonding agent consisting essentially of a coprecipitate of about 2-25 weight percent of an inorganic oxidizing agent and about 98-75 weight percent of a rubber.

5. The propellant charge according to claim 4 wherein said coprecipitate consists essentially of about 5-15 weight percent of said inorganic oxidizing agent, and about 95-85 weight percent of said rubber.

6. A solid propellant charge having a cylindrical configuration and an axial perforation, said charge comprising a plurality of blocks of propellant of the composite type comprising about 75-90 parts by weight of ammonium nitrate and 10-25 parts by weight of a binder which comprises a rubbery copolymer of 1,3-butadiene and 2-methyl-5-vinylpyridine, said blocks being bonded together at their contiguous surfaces with a bonding agent and arranged so as to provide an exposed burning surface wihch defines said perforation, said bonding agent consisting essentially of a coprecipitate of about 5-15 weight percent of ammonium perchlorate and about 95-85 weight percent of a rubbery copolymer of 1,3-butadiene and 2-methyl-5-vinylpyridine.

7. A composite solid propellant charge comprising a plurality of blocks of propellant of the composite type comprising a major amount of ammonium perchlorate and a minor amount of a rubbery copolymer of 1,3-butadiene and 2-methyl-5-vinylpyridine, said blocks being bonded together at their contiguous surfaces with a coprecipitate consisting essentially of about 2-25 weight percent of ammonium perchlorate and about 98-75 weight percent of a rubbery copolymer of 1,3-butadiene and 2-methyl-5-vinylpyridine.

References Cited in the file of this patent

UNITED STATES PATENTS

| | | |
|---|---|---|
| 1,920,075 | Haenichen | July 25, 1933 |
| 2,479,470 | Carr | Aug. 16, 1949 |
| 2,484,355 | Parsons | Oct. 11, 1949 |
| 2,600,678 | O'Neill | June 17, 1952 |
| 2,697,325 | Spaulding | Dec. 21, 1954 |
| 2,857,258 | Thomas | Oct. 21, 1958 |

OTHER REFERENCES

Seifert: Jet Propulsion, November 1955, pages 597 and 602. (Copy in Scientific Library.)